United States Patent
Eronen et al.

(10) Patent No.: US 10,754,888 B2
(45) Date of Patent: Aug. 25, 2020

(54) ESTABLISHMENT OF AN ASSOCIATION BETWEEN AN OBJECT AND A MOOD MEDIA ITEM

(71) Applicant: NOKIA CORPORATION, Espoo (FI)

(72) Inventors: Antti Johannes Eronen, Tampere (FI); Arto Juhani Lehtiniemi, Lempaala (FI); Juha Henrik Arrasvuori, Tampere (FI); Jukka Antero Holm, Tampere (FI)

(73) Assignee: Nokia Technologies Oy, Espoo (FI)

( * ) Notice: Subject to any disclaimer, the term of this patent is extended or adjusted under 35 U.S.C. 154(b) by 459 days.

(21) Appl. No.: 14/549,526

(22) Filed: Nov. 20, 2014

(65) Prior Publication Data
US 2015/0142799 A1 May 21, 2015

(30) Foreign Application Priority Data
Nov. 21, 2013 (EP) .................. 13193742

(51) Int. Cl.
*G06F 16/58* (2019.01)
*H04L 29/08* (2006.01)
*H04L 12/58* (2006.01)
*G06F 16/907* (2019.01)

(52) U.S. Cl.
CPC .......... *G06F 16/58* (2019.01); *G06F 16/907* (2019.01); *H04L 51/32* (2013.01); *H04L 67/10* (2013.01)

(58) Field of Classification Search
CPC ......... G06F 17/30265; G06F 17/30247; G06F 16/58; G06F 16/907
See application file for complete search history.

(56) References Cited

U.S. PATENT DOCUMENTS

| | | | |
|---|---|---|---|
| RE38,401 E * | 1/2004 | Goldberg | G06F 17/30274 715/720 |
| 9,716,599 B1 * | 7/2017 | Gates | H04L 12/58 |
| 2006/0251292 A1 | 11/2006 | Gokturk et al. | |
| 2012/0072939 A1 * | 3/2012 | Crenshaw | H04N 21/4415 725/12 |
| 2012/0294477 A1 * | 11/2012 | Yang | G06K 9/4671 382/103 |
| 2013/0027428 A1 | 1/2013 | Graham et al. | |
| 2013/0117365 A1 | 5/2013 | Padmanabhan et al. | |
| 2013/0276007 A1 * | 10/2013 | Li | H04N 21/44218 725/12 |
| 2014/0079212 A1 * | 3/2014 | Sako | H04M 1/60 379/395 |
| 2014/0337880 A1 * | 11/2014 | Sorbel | H04N 21/812 725/34 |
| 2015/0052462 A1 * | 2/2015 | Kulkarni | G06F 3/04817 715/765 |

OTHER PUBLICATIONS

European Search Report received in European Patent Application No. 13193742.7, dated May 9, 2014, 7 pages.

* cited by examiner

*Primary Examiner* — Loc Tran
(74) *Attorney, Agent, or Firm* — Harrington & Smith

(57) ABSTRACT

A method comprising identifying a mood media item association with an object media item, the mood media item being a media item of a face of a user while the object media item is being viewed by the user, determining an object that is associated with the object media item, and causing establishment of an association between the object and the mood media item is disclosed.

20 Claims, 11 Drawing Sheets

| Object 502 | Mood Media Item 502A<br>Mood Media Item 502B |
|---|---|
| Object 504 | Mood Media Item 504A |
| Object 506 | Mood Media Item 506A<br>Mood Media Item 506B<br>Mood Media Item 506C |

FIG. 5A

| Mood Media Item 522A | Object 522 |
|---|---|
| Mood Media Item 522B | Object 522 |
| Mood Media Item 524A | Object 524 |
| Mood Media Item 526A | Object 526 |
| Mood Media Item 526B | Object 526 |
| Mood Media Item 526C | Object 526 |

FIG. 5B

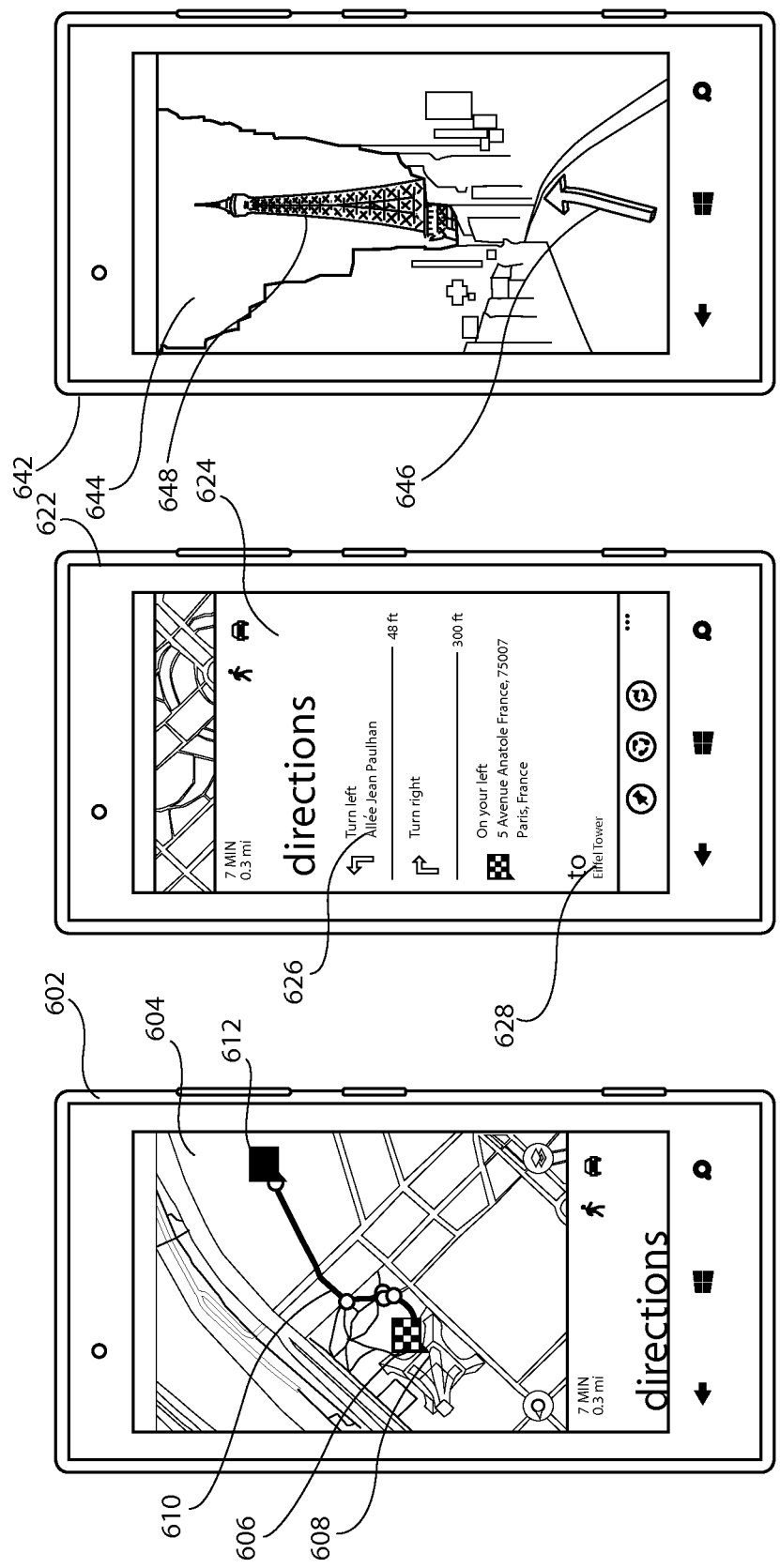

ESTABLISHMENT OF AN ASSOCIATION BETWEEN AN OBJECT AND A MOOD MEDIA ITEM

RELATED APPLICATION

This application claims priority to European Application No. 13193742.7 filed Nov. 21, 2013, which is incorporated herein by reference in its entirety.

TECHNICAL FIELD

The present application relates generally to establishment of an association between an object and a mood media item.

BACKGROUND

Electronic apparatuses, such as mobile communication apparatuses, are becoming more and more pervasive. Apparatuses can perform numerous functions and a user can provide inputs that will cause an apparatus to take desired actions or change its behavior based on the inputs. It may be desirable for user interaction with an apparatus to be convenient for the user. It may also be desirable to design the apparatus so that the apparatus functions in ways that excite the user.

SUMMARY

Various aspects of examples of the invention are set out in the claims.

One or more embodiments may provide an apparatus, a computer readable medium, a non-transitory computer readable medium, a computer program product, and a method for identifying a mood media item association with an object media item, the mood media item being a media item of a face of a user while the object media item is being viewed by the user, determining an object that is associated with the object media item, and causing establishment of an association between the object and the mood media item.

One or more embodiments may provide an apparatus, a computer readable medium, a computer program product, and a non-transitory computer readable medium having means for identifying a mood media item association with an object media item, the mood media item being a media item of a face of a user while the object media item is being viewed by the user, means for determining an object that is associated with the object media item, and means for causing establishment of an association between the object and the mood media item.

One or more embodiments may provide an apparatus, the apparatus comprising at least one processor and at least one memory, and the memory comprising machine-readable instructions that, when executed, cause the apparatus to perform identification of a mood media item association with an object media item, the mood media item being a media item of a face of a user while the object media item is being viewed by the user, determination of an object that is associated with the object media item, and causation of establishment of an association between the object and the mood media item.

In at least one example embodiment, identification of the mood media item associated with the object media item comprises receipt of the mood media item and information indicative of an association between the mood media item and the object media item.

In at least one example embodiment, the object media item comprises a representation of the object.

In at least one example embodiment, the mood media item is a media item of the face of the user while the representation of the object is being viewed by the user.

In at least one example embodiment, the object media item is a different mood media item associated with the object.

In at least one example embodiment, the mood media item is an image media item.

In at least one example embodiment, the mood media item is a video media item.

In at least one example embodiment, identification of the mood media item associated with the object media item comprises causation of rendering of the object media item, and capture of the mood media item based, at least in part, on the rendering of the object media item.

In at least one example embodiment, the mood media item is captured by a camera module.

In at least one example embodiment, the camera module is a front facing camera module.

In at least one example embodiment, the mood media item is captured absent user interaction subsequent to causation of rendering of the object media item.

In at least one example embodiment, the mood media item is captured upon elapse of a designated duration after causation of rendering of the object media item.

In at least one example embodiment, causation of rendering comprises rendering of the object media item.

In at least one example embodiment, rendering comprises display of visual information comprised by the object media item.

In at least one example embodiment, the object media item is a different mood media item associated with the object, and determination of the object is based, at least in part, on metadata associated with the different mood media item that identifies at least part of the object.

In at least one example embodiment, the object media item comprises a representation of the object, and determination of the object is based, at least in part, on metadata associated with the object media item.

In at least one example embodiment, the metadata associated with the object media item identifies at least part of the object, and the determination of the object is further based, at least in part, on the identification of the object.

In at least one example embodiment, the metadata associated with the object media item comprises location information indicative of a location associated with capture of the object media item, and determination of the object is further based, at least in part, on the location information.

In at least one example embodiment, the metadata associated with the object media item comprises orientation information indicative of an orientation associated with capture of the object media item, and determination of the object is further based, at least in part, on the orientation information.

In at least one example embodiment, the object media item comprises a representation of the object, and determination of the object comprises identification of the object based, at least in part, on the representation of the object.

In at least one example embodiment, identification of the representation of the object comprises utilization of at least one object analysis module.

In at least one example embodiment, identification of the representation of the object comprises image segmentation and image recognition of the object by way of image recognition.

In at least one example embodiment, identification of the object comprises identification of at least part of the object based, at least in part, on the representation of the object.

In at least one example embodiment, identification of the object is further based, at least in part, on object identification information.

In at least one example embodiment, the object is a building, the object identification information is building model information, and identification of the building is based, at least in part, on the building model information.

One or more example embodiments further perform causation of sending of the mood media item and information indicative of the association between the object and the mood media item to a separate apparatus.

In at least one example embodiment, causation of establishment of the association between the object and the mood media item comprises causation of establishment of an association between the mood media item and an entirety of the object.

In at least one example embodiment, causation of establishment of the association between the object and the mood media item comprises causation of establishment of an association between the mood media item and a part of the object that is less than an entirety of the object.

In at least one example embodiment, causation of establishment of the association between the object and the mood media item comprises storage of information indicative of the association in memory.

In at least one example embodiment, causation of establishment of the association between the object and the mood media item comprises sending of a directive to a separate apparatus, the directive identifying the association.

In at least one example embodiment, the object is a building, the part of the object is at least one facade of the building, and causation of establishment of the association between the object and the mood media item comprises causation of establishment of an association between the mood media item and the facade of the building.

One or more example embodiments further perform causation of rendering of the mood media item such that a visual representation of the mood media item is displayed, receipt of information indicative of a mood media item selection input identifying the mood media item, and causation of performance of an object selection action associated with the object based, at least in part, on the mood media item selection input and the association between the mood media item and the object.

In at least one example embodiment, the object selection action comprises rendering of a representation of at least one object information media item associated with the object.

In at least one example embodiment, the object selection action comprises display of an indication of a location of the object.

In at least one example embodiment, the object is a point of interest, and further comprising determination of the location of the object based, at least in part, on retrieval of information associated with the location of the point of interest.

In at least one example embodiment, the indication of the location of the object is an object location marker, and display of the indication of the location of the object comprises display of the object location marker in relation to a map comprising the location.

In at least one example embodiment, the object location marker is displayed in relation to a navigation route to the location of the object, and further comprising determination of the navigation route based, at least in part, on a current location and the location of the object.

One or more example embodiments further perform determination of the current location.

In at least one example embodiment, the indication of the location of the object is a navigation cue, and display of the indication of the location of the object comprises display of the navigation cue such that the navigation cue points towards the location of the object when viewed from a viewer's perspective.

In at least one example embodiment, the indication of the location of the object is at least one navigation direction associated with a navigation route, and display of the indication of the location of the object comprises display of the navigation direction.

One or more example embodiments further perform determination of the navigation route based, at least in part, on a current location and the location of the object.

BRIEF DESCRIPTION OF THE DRAWINGS

For a more complete understanding of embodiments of the invention, reference is now made to the following descriptions taken in connection with the accompanying drawings in which:

FIGS. 5A-5B are diagrams showing object and mood media item association according to at least one example embodiment;

FIGS. 6A-6C are illustrations showing information associated with an object selection action according to at least one example embodiment;

DETAILED DESCRIPTION OF THE DRAWINGS

Figure 1:
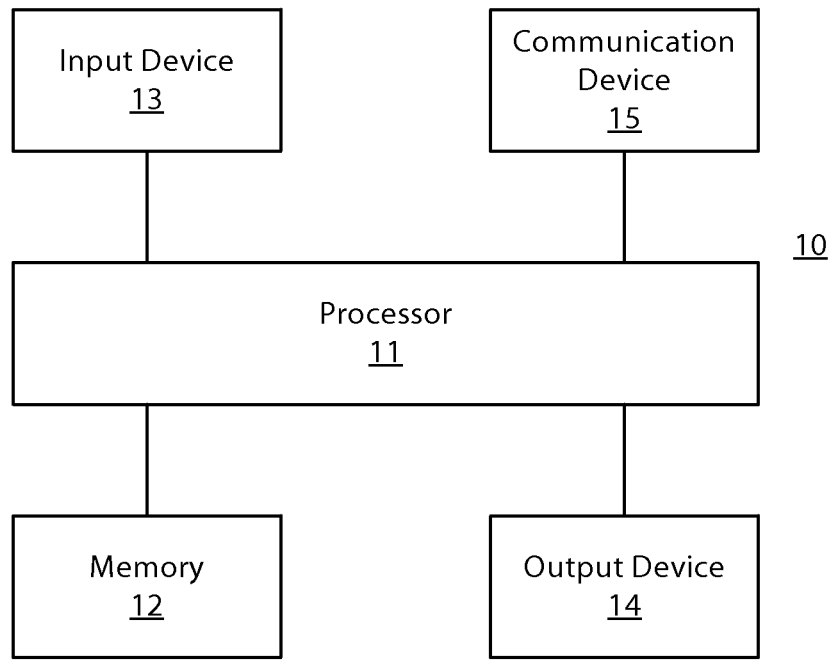
FIG. 1 is a block diagram showing an apparatus according to at least one example embodiment.

An embodiment of the invention and its potential advantages are understood by referring to FIGS. 1 through 12 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, a refrigerator, and automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries. For example, the apparatus may relate to, at least part of, a non-carryable apparatus, such as a large screen television, a refrigerator, a kiosk, an automobile, and/or the like.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus that comprises a display, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may relate to information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2:
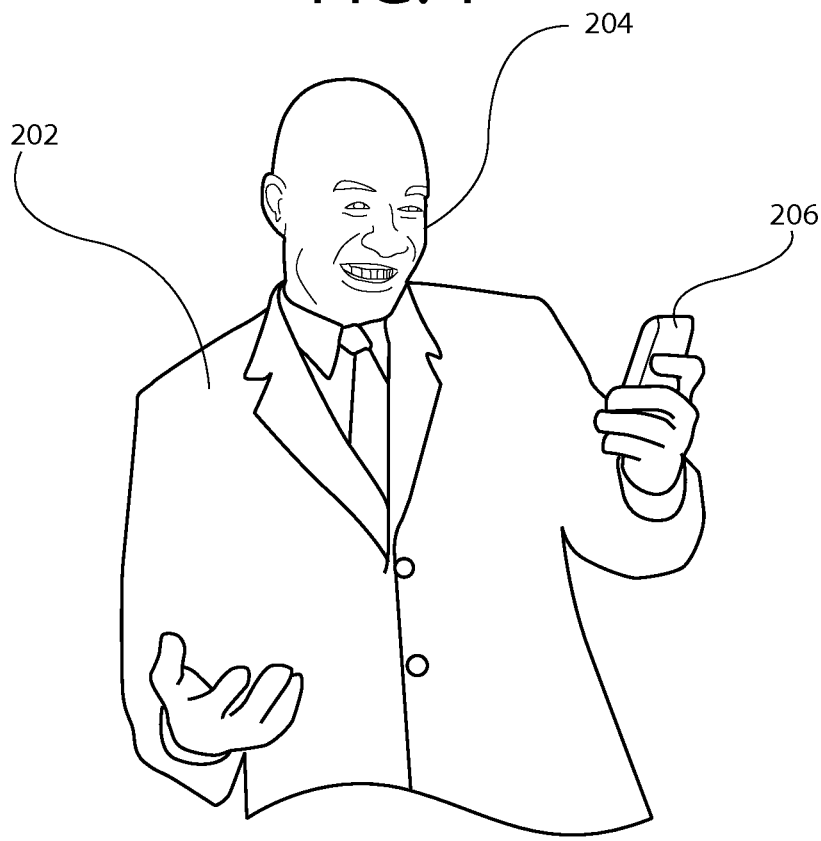
FIG. 2 is an illustration showing apparatus use according to at least one example embodiment.

FIG. 2 is an illustration showing apparatus use according to at least one example embodiment. The example of FIG. 2 is merely an example and does not limit the scope of the claims. For example, apparatus orientation may vary, apparatus position may vary, and/or the like.

FIG. 2 is an illustration showing apparatus use according to at least one example embodiment. In the example of FIG. 2, user 202 is holding apparatus 206 in the user's hand. User 202 may, for example, be viewing content displayed on a screen of apparatus 206. In the example of FIG. 2, user 202 is making a facial expression on face 204 while apparatus 206 is rendering content viewed by the user, while user 202 is viewing the content rendered by apparatus 206, and/or the like.

In some circumstances, it may be desirable to capture a user's reaction in response to viewing content associated with an apparatus. For example, it may be desirable to capture spontaneous and/or emotional reactions of a user in response to a specific image. Such spontaneous and/or emotional reactions may be desirable in order to facilitate capture the excitement surrounding a first impression, in order to facilitate future remembrance of an interaction, and/or the like. In at least one example embodiment, a user may view a media item. A media item may, for example, relate to an image media item, a video media item, and/or the like. An image media item may be associated with a static representation of image, a still digital photograph, and/or the like. For example an image media item may be associated with an image of a landscape, a picture of a friend, a representation of an object, and/or the like. A video media item may be associated with a movie, a video clip, a sequence of still images, and/or the like. For example, a video media item may be associated with a video of a performance, a clip of a conversation, and/or the like. In at least one example embodiment, a media item that portrays a user's reaction to viewing another media item relates to a mood media item. For example, the mood media item may be a media item of a face of a user while another media item is being viewed by the user.

Figure 3A:
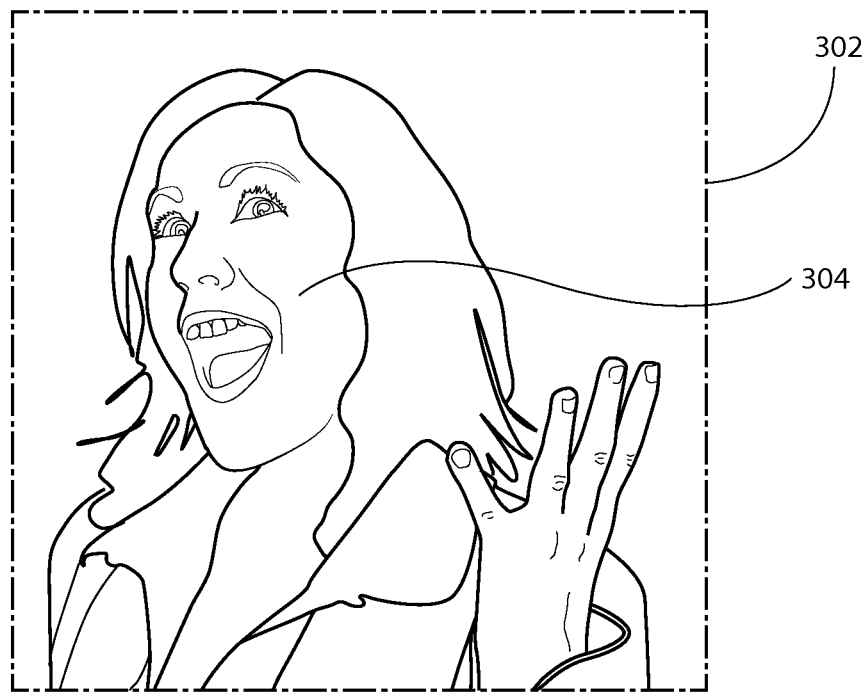
FIGS. 3A-3B are illustrations showing apparatus use according to at least one example embodiment.
Figure 3B:
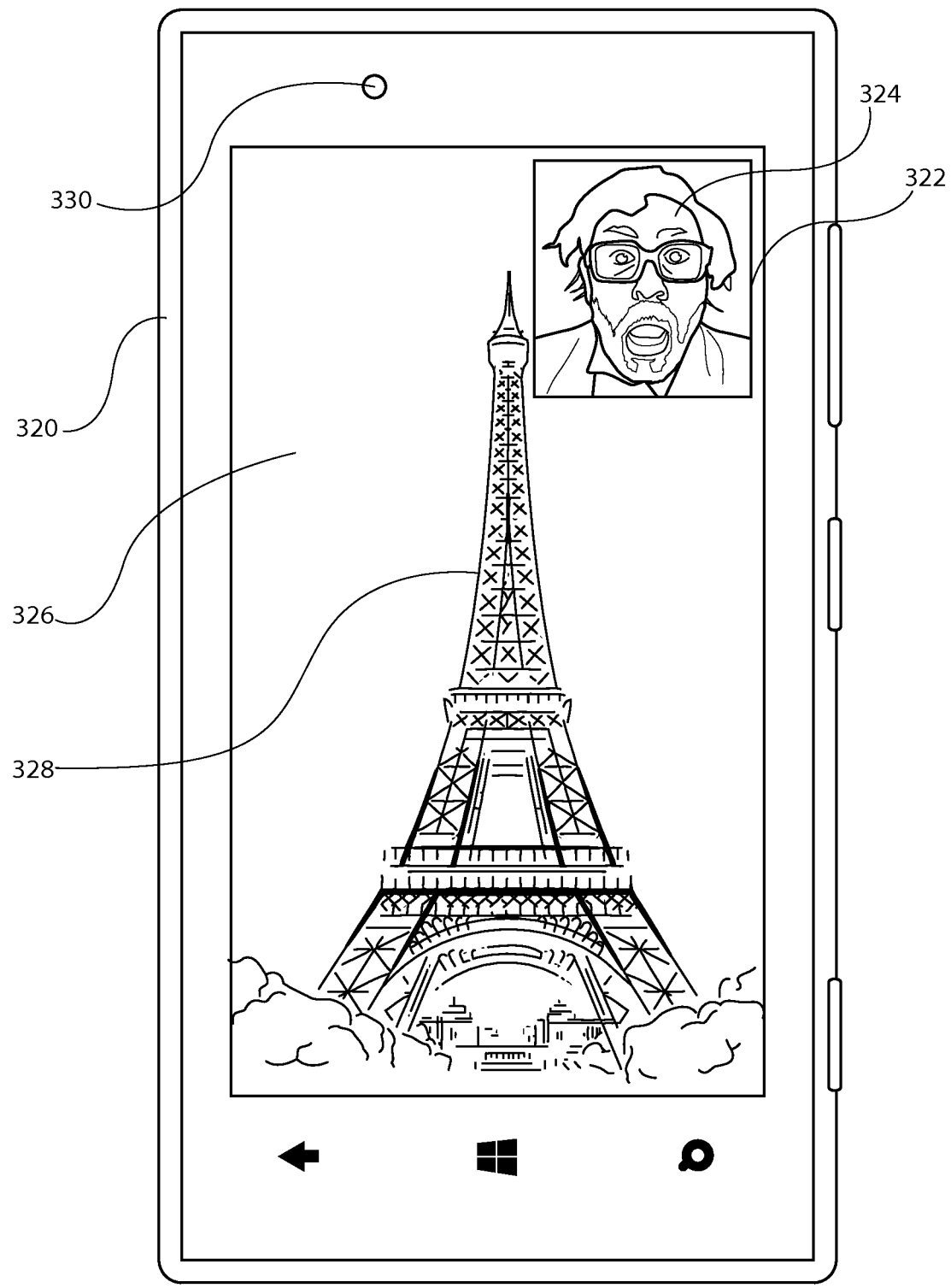

In the example of FIG. 2, apparatus 206 may comprise a camera module similar to camera module 330 of FIG. 3B. In at least one example embodiment, apparatus 206 captures a mood media item of face 204 of user 202 while apparatus 206 is displaying the content viewed by user 202, while user 202 is viewing the content rendered by apparatus 206, and/or the like. Capture of the mood media item may be similar as described regarding FIGS. 3A-3B. For example, user 202 may be viewing a media item on a display of apparatus 206. In response to viewing the media item on apparatus 206, user 202 may spontaneous react to the media item by way of a facial expression, a laugh, a gesture, and/or the like. In some circumstances, user 202 may desire to capture such a response for future recollection, for sharing, and/or the like. In this manner, user 202 will be able to share with others how he reacted to the media item displayed on apparatus 206, how the media item made him feel, how much he enjoyed the media item, and/or the like.

FIGS. 3A-3B are illustrations showing apparatus use according to at least one example embodiment. The examples of FIGS. 3A-3B are merely examples and do not limit the scope of the claims. For example, apparatus design, orientation, display, and/or the like may vary, mood media item proportions, location, and/or the like may vary, display of the object media item may vary, and/or the like.

FIG. 3A is an illustration showing apparatus use according to at least one example embodiment. In the example of FIG. 3A, mood media item 302 is an image media item comprising a visual representation of a capture of a reaction of user 304 in response to user 304 viewing an object media item. The capture of mood media item 302 may have been caused by the display of the object media item, by the viewing of the object media item by user 304, and/or the like. For example, user 304 may have viewed a media item that excited or surprised her. As such, mood media item 302 captures the excitement of user 304.

As discussed previously, in some circumstances, it may be desirable to capture a user's reaction in response to viewing content displayed by an apparatus. In some circumstances, a user may desire to capture a mood media item while viewing a media item associated with a representation of an object. In at least one example embodiment, an object media item is a media item associated with an object. An object may be a building, a landmark, a point of interest, a person, an automobile, and/or the like. For example, the object media item may comprise an image of a specific building, a video of a specific landmark, and/or the like, and the object may be the specific building or the specific landmark, respectively. The object media item may be an image media item, a video media item, and/or the like. In at least one example embodiment, an object media item comprises a representation of an object. In such an example embodiment, a mood media item is a media item of a face of the user while the representation of the object is being viewed by the user. In at least one example embodiment, an apparatus identifies a mood media item associated with an object media item. A mood media item associated with an object media item may, for example, be a mood media item captured while viewing the object media item, a mood media item captured by another user while viewing the object media item, and/or the like.

In some circumstances, it may be desirable to identify a mood media item associated with another mood media item. For example, it may be desirable to capture a user's reaction in response to viewing another user's previously captured reaction. In at least one example embodiment, an object media item is a different mood media item associated with an object. For example, a user may visit Paris and view the Eiffel Tower. In such an example, a very entertaining and/or emotional mood media item of the user may be captured while the user is viewing the Eiffel Tower. Continuing such an example, another user may view the user's very entertaining and/or emotional mood media item and may desire to capture his or her own reaction to the user's mood media item. For example, a user's mood media item may be particularly outlandish, and another user may desire to capture his or her reaction in order to facilitate communication of the reaction to the user. Such sharing of mood media items may be desirable in order to facilitate social communication, online sharing, and/or the like.

In order to facilitate capturing of a mood media item associated with an object media item, it may be desirable to display the object media item on a user's apparatus. For example, a user may view an image of an object on the user's phone, tablet, and/or the like. In at least one example embodiment, identification of a mood media item associated with an object media item comprises causing of rendering of the object media item and capturing the mood media item. In such an example embodiment, capturing of the mood media item may be based, at least in part, on the rendering of the object media item. For example, capturing of the mood media item may be caused by rendering of the object media item. In at least one example embodiment, causing rendering comprises rendering of the object media item. Rendering of the object media item may, for example, comprise display of visual information comprised by the object media item, sending the object media item to a separate apparatus for rendering, and/or the like. For example, an object media item may comprise an image of an object, and rendering of the object media item may relate to displaying the image on a display of an apparatus.

In at least one example embodiment, a mood media item is captured by way of a camera module. The camera module may, for example, be comprised by input device 13 of FIG. 1. In order to facilitate capturing of a mood media item of a user while the user is viewing an object media item, it may be desirable to utilize a camera module that is facing the user while the user is viewing a display of an apparatus. For example, the display of the apparatus may be on the front side of the apparatus. In at least one example embodiment, the camera module is a front facing camera module. The front facing camera module, for example, may be a camera module positioned such that a user operating an apparatus comprising the front facing camera module is within a viewable area of the front facing camera module. For example, in the illustration of FIG. 2, a front facing camera module comprised by apparatus 206 may be positioned such that face 204 of user 202 is in a capture region associated with the front facing camera module.

In order to facilitate capture of a spontaneous and/or emotional reaction of a user, it may be desirable for an apparatus to capture a mood media item automatically. In at least one example embodiment, a mood media item may be captured absent user interaction subsequent to causation of rendering of the object media item. For example, capturing of the mood media item may be caused by rendering of the object media item. In some circumstances, it may be desirable to delay the automatic capturing of the mood media item. For example, it may be desirable to allow time for a user to view an object media item, for the user to appreciate the content associated with the object media item, for the user to develop and express a reaction in response to the object media item, and/or the like. In at least one example embodiment, a mood media item is captured upon elapse of a designated duration after causation of rendering of the object media item. The designated duration may, for example, be a predetermined duration, a pre-designated duration, a user-configurable duration, and/or the like. In at least one example embodiment, a mood media item may be captured for a longer time span. For example, the mood media item may be captured from rendering of an object media item and for a specified duration. In such an example, emotional highlights may be identified and extracted from the mood media item. In some circumstances, more than one user reaction may be identified in a mood media item. The most prominent, longest lasting, uncommon, most repeated, etc. reaction may be used as a representative mood media item based on user preferences. In at least one example embodiment, an apparatus may provide a user of the apparatus with an option to edit a mood media item. In such an example embodiment, editing operations may be adjusting the start and/or end time of a video clip containing the mood media item, selecting one or more frames of a video clip to be used as the mood media item, and/or the like.

In some circumstances, it may be desirable to communicate a captured mood media item to a separate apparatus, for example, to a server associated with a mood media item related service platform. In at least one example embodiment, identification of a mood media item associated with an object media item comprises receipt of the mood media item and information indicative of an association between the mood media item and the object media item. In such an example embodiment, the mood media item may be captured in response to displaying of the associated object media item. Information indicative of the association between the mood media item and the object media item may, for example, be comprised by data associated with the mood media item, information indicative of such an association, and/or the like.

In some circumstances, it may be desirable to associate a mood media item with an object associated with an object media item. For example, an object may be represented in two or more object media items, and may be associated with two or more mood media items capture in response to the two or more object media items. In such an example, it may be desirable to aggregate the associations of the mood media items such that the mood media items are associated with the object represented by the object media items. For example, there may be a plurality of mood media items associated with an object media item that comprises an image of the Eiffel Tower. In such an example, it may be desirable to associate the mood media items with the Eiffel Tower. In order to facilitate establishment of such an association, in at least one example embodiment, an apparatus determines an object that is associated with an object media item. For example, as previously discussed, the apparatus may determine that an object media item is associated with the Eiffel Tower.

In some circumstances, it may be desirable to determine an object associated with an object media item by way of metadata associated with the object media item. In at least one example embodiment, the object media item comprises a representation of the object, and determination of the object is based, at least in part, on metadata associated with the object media item. For example, the representation of the object may be a visual representation of the object, a graphical representation of the object, and/or the like. Metadata associated with the object media item may, for example, relate to ancillary information describing the object media item. For example, the metadata may identify at least part of the object by way of location information, subject matter information, and/or the like. In at least one example embodiment, metadata associated with an object media item identifies at least part of an object associated with the object media item. In such an example embodiment, determination of the object may be based, at least in part, on the metadata associated with the object media item. For example, determination of the object may be based, at least in part, on the identification of the object. In at least one example embodiment, metadata associated with an object media item comprises location information indicative of a location associated with capture of the object media item. For example, the object media item may have been captured at the location of the object associated with the object media item. In such an example embodiment, determination of the object may be based, at least in part, on the location information. For example, the location information associated with the object media item may be correlated with corresponding location information associated with an object. For example, a specific location in Paris, France associated with an object media item may be determined to be a location associated with the Eiffel Tower. In such an example, determination that the object of the object media item is the Eiffel Tower may be based, at least in part, on the location information indicating a specific location in Paris, France.

In some circumstances, additional metadata may be desirable in order to facilitate determination of an object associated with an object media item. For example, a specific location may be associated with several objects. In at least one example embodiment, metadata associated with an object media item comprises orientation information indicative of an orientation associated with capture of the object media item. For example, the orientation associated with capture of the object media item may relate to a compass direction, a vertical tilt, and/or the like. In such an example embodiment, determination of the object may be further based, at least in part, on the orientation information. For example, a specific location may be associated with two objects, a north object to the north and a southwest object to the southwest. In such an example, determination that the object relates to the north object may be based, at least in part, on orientation information indicating that the object media item was captured from the location while facing a northern direction. Similarly, determination that the object relates to the southwest object may be based, at least in part, on orientation information indicating that the object media item was captured from the location while facing a southwestern direction. In circumstances in which the object media item is a mood media item associated with an object, it may be desirable to determine the object by way of metadata associated with the object media item. In at least one example embodiment, determination of an object is based, at least in part, on metadata that identifies at least part of the object associated with the object media item, the object media item being a mood media item. For example, a user may view a mood media item captured by another user while viewing a representation of the Eiffel Tower. The Eiffel Tower may be determined to be the object of the object media item based, at least in part, on metadata associated with the viewed mood media item.

In some circumstances, it may be desirable to determine an object associated with an object media item by way of a representation of the object that is comprised by the object media item. For example, in circumstances when metadata associated with the object media item may be lacking, may be insufficient, and/or the like, it may be desirable to nonetheless provide for identification of the object by way of the representation of the object. It should be understood that there are many existing manners for identifying visual representations of objects in a visual media item, and that there will likely be many future manners for identifying visual representations of objects in a visual media item, and that such solutions do not necessarily limit the claims in any way.

In at least one example embodiment, determination of an object comprises identification of the object based, at least in part, on a representation of the object. The representation of the object may relate to a region of an object media item that comprises visual information indicative of the object, a region of the representation of the object that comprises visual information indicative of the object, and/or the like. In some circumstances, the identified region of the representation of the object may relate to a region that may include the entirety of the representation of the object. In such circumstances, identification of the object may comprise identification of an object in its entirety. In some circumstances, the identified region of the representation of the object may relate to a region that may include a majority of the representation of the object, but less than the entirety of the representation of the object. In such circumstances, identification of the object may comprise identification of the object in its entirety, identification of a component of the object, identification of a portion of the object, and/or the like. Similarly, the region may include, at least a part of, a representation of information that fails to correspond with the object, such as background information, a different object, and/or the like. In at least one example embodiment, identification of the representation of the object comprises identification of the object and the portion of the object media item that corresponds with the identified object. For example, identification of the representation may comprise determination that a particular region of the object media item comprises a visual representation of an object that has a particular identity, classification, definition, and/or the like.

In at least one example embodiment, the apparatus utilizes a region of interest detection module for determination of the representation of the object. In at least one example embodiment, the apparatus utilizes an object analysis module for determination of the visual representation of the object. For example, a region of interest detection and/or object analysis module may be capable of analyzing the content of images or video frames and recognizing objects, such as vehicles, buildings, landmarks, and so on in the content. Such detection and/or analysis may be performed by way of image segmentation, analysis, and image recognition methods. For example, the apparatus may utilize a detection method in order to facilitate detection and recognition of a landmark in the image. For example, such visual object recognition may involve extracting one or more features from the input image, comparing the features to a database of features extracted from images where the object contained in the image is known, and determining the object based, at least in part, on the comparison.

In some circumstances, identification of an object associated with an object media item may be facilitated by way of utilization of object identification information. For example, object identification information may relate to information associated with the object that may support identification of the object, information indicative of characteristics of the object that may enable identification of the object, and/or the like. In at least one example embodiment, identification of the object is further based, at least in part, on object identification information. For example, in some circumstances, the object may be a building. In such circumstances, the object identification information may be building model information. For example, building model information may relate to three-dimensional building model data, information associated with object size, shape, etc., and/or the like. In such an example, identification of the building may be based, at least in part, on the building model information.

In order to facilitate sharing of relevant mood media items and attribution of mood media items to specific objects, it may be desirable to establish an association between at least one mood media item and an object. In at least one example embodiment, an apparatus causes establishment of an association between the mood media item and the object. Establishment of the association between the mood media item and the object may be similar as described regarding FIGS. 5A-5B.

FIG. 3B is an illustration showing apparatus use according to at least one example embodiment. In the example of FIG. 3B, apparatus 320 comprises a display and camera module 330. Camera module 330 is a front facing camera module. In the example of FIG. 3B, apparatus 320 is rendering object media item 326 and mood media item 322 on the display of apparatus 320. Object media item 326 comprises a representation of object 328, the Eiffel Tower. Such a determination of object 328 may be based, at least in part, on metadata, location information, orientation information, object detection and identification, and/or the like. In the example of FIG. 3B, mood media item 324, depicting a reaction of user 324, may have been captured via camera module 330 in response to apparatus 320 displaying object media item 326, in response to user 324 viewing object media item 326, and/or the like.

Figure 4:
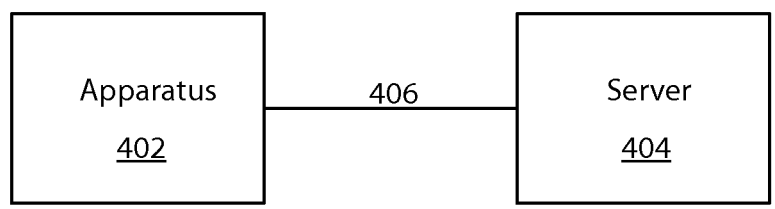
FIG. 4 is a block diagram showing apparatus communication according to at least one example embodiment.

FIG. 4 is a block diagram showing apparatus communication according to at least one example embodiment. The example of FIG. 4 is merely an example and does not limit the scope of the claims. For example, apparatus count may vary, server count may vary, communication channels may vary, and/or the like.

In some circumstances, it may be desirable to allow for centralized management, centralized storage, uniform distribution, etc. of mood media items and associations between the mood media items and objects. For example, a user may desire to share a captured mood media item with a different user. In such an example, the user may indicate a desire to communicate the mood media item to a separate apparatus such that the different user may view the mood media item. In at least one example embodiment, an apparatus causes sending of a mood media item and information indicative of an association between the mood media item and an object to a separate apparatus. The separate apparatus may, for example, be a server, computer, a repository, a service platform, another apparatus, and/or the like.

In some circumstances, it may be desirable to communicate an object media item to a separate apparatus in order to determine an object associated with the object media item. For example, it may be desirable to offload such a determination for purposes relating to computational capacity, object identification resource availability, and/or the like. In at least one example embodiment, an apparatus communicates an object media item to a separate apparatus. In such an example embodiment, the apparatus may receive information indicative of an object associated with the communicated object media item, information indicative of an identity of the object, and/or the like. The separate apparatus may, for example, relate to a server, computer, a repository, a service platform, another apparatus, and/or the like.

FIG. 4 is a block diagram showing apparatus communication according to at least one example embodiment. In the example of FIG. 4, apparatus 402 is in communication with server 404 via communication channel 406. Apparatus 402 may be in direct communication with server 404 via communication channel 406. Alternatively, communication channel 406 may comprise one or more additional apparatuses and/or communication channels such that apparatus 402 may be in indirection communication with server 404. Such additional apparatus may be routers, switches, hubs, servers, and/or the like. In the example of FIG. 4, apparatus 402 may cause sending of a mood media item and information indicative of an association between the mood media item and an object to a server 404. For example, as illustrated and with respect to FIG. 3B, apparatus 402 may cause sending of mood media item 322 of FIG. 3B and information indicative of an association between mood media item 322 of FIG. 3B and object 328 of FIG. 3B to server 404.

For example, apparatus 402 may relate to apparatus 320 of FIG. 3B. In such an example, apparatus 402 may cause display of object media item 326 of FIG. 3B associated with object 328 of FIG. 3B. In the example of FIG. 4, apparatus 402 may communicate object media item 326 of FIG. 3B to server 404 and receive information that identifies object 328 of FIG. 3B as the Eiffel Tower. Based, at least in part, on the display of object media item 326 of FIG. 3B, apparatus 402 may capture mood media item 322 of FIG. 3B and cause establishment of an association between mood media item 322 of FIG. 3B and object 328 of FIG. 3B, the Eiffel Tower. Further, apparatus 402 may communicate information indicative of the association between mood media item 322 of FIG. 3B and object 328 of FIG. 3B, the Eiffel Tower, to server 404. In such an example, server 404 may aggregate such associations, may communicate such associations to different apparatuses, and/or the like.

FIGS. 5A-5B are diagrams showing object and mood media item association according to at least one example embodiment. The examples of FIGS. 5A-5B are merely examples and do not limit the scope of the claims. For example, object count may vary, mood media item count may vary, associations between objects and mood media items may vary, and/or the like.

As previously discussed, in some circumstances, it may be desirable to cause establishment of an association between a mood media item and an object. In some circumstances, it may be desirable to associate a mood media item with the entirety of an object. For example, it may be desirable to associate a mood media item generally with the entirety of the Eiffel Tower. In such an example, a user may capture a mood media item while viewing a representation of the Eiffel Tower that comprises a visual representation of the entirety of the structure. In such an example, it may be desirable to establish an association between the Eifel Tower and the mood media item. In at least one example embodiment, causation of establishment of an association between an object and a mood media item comprises causation of establishment of an association between the mood media item and an entirety of the object. In some circumstances, it may be desirable to associate a mood media item with less than the entirety of an object. For example, it may be desirable to associate a mood media item with less than the entirety of the Eiffel Tower. In such an example, a user may capture a mood media item while viewing a representation of the Eiffel Tower that comprises a visual representation of the top deck of the structure, the western facade of the Eiffel Tower, the elevator system of the Eiffel Tower, and/or the like. In at least one example embodiment, causation of establishment of an association between an object and a mood media item comprises causation of establishment of an association between the mood media item and a part of the object that is less than an entirety of the object. For example, the object may be a building, and the part of the object is at least one facade of the building, at least one level of the building, at least one feature of the building, and/or the like. In such an example, causation of establishment of an association between the object and the mood media item comprises causation of establishment of an association between the mood media item and the facade of the building, the level of the building, the feature of the building, and/or the like.

In some circumstances, it may be desirable to identify associations between mood media items and object by way of a mood media item object association table. In at least one example embodiment, a mood media item object association table relates to a table that comprises one or more associations between a specific mood media item and a specific object. In at least one example embodiment, a mood media item object association table relates to a table that comprises one or more associations between an object and one or more mood media items. In at least one example embodiment, causation of establishment of an association between an object and a mood media item comprises storage of information indicative of the association in memory. For example, causation of establishment of an association between an object and a mood media item comprises storage of information indicative of the association in a mood media item object association table. In at least one example embodiment, causation of establishment of an association between an object and a mood media item comprises sending of a directive to a separate apparatus. The directive may, for example, identify the association between the object and the mood media item, the association between the mood media item and the object, and/or the like. For example, apparatus 402 of FIG. 4 may send a directive indicating establishment of an association between an object and a mood media item to server 404 of FIG. 4. Such a directive may cause server 404 of FIG. 4 to establish the indicated association.

FIG. 5A is a diagram showing object and mood media item association according to at least one example embodiment. The example of FIG. 5A illustrates an embodiment of a mood media item object association table. The mood media item object association table of FIG. 5A comprises information indicative of associations between object 502 and mood media items 502A and 502B, between object 504 and mood media item 504A, and between object 506 and mood media items 506A, 506B, and 506C. For example, object 506 may be the Eiffel Tower, and mood media items 506A, 506B, and 506C may be three mood media items captured by three different users while viewing three different object media items comprising three different representations of the Eiffel Tower, three mood media items capture by the different users while viewing the same object media item, and/or the like. As such, an association between object 506 and mood media items 526A, 526B, and 526C has been established and stored in the mood media item object association table of FIG. 5A.

FIG. 5B is a diagram showing object and mood media item association according to at least one example embodiment. The example of FIG. 5B illustrates an embodiment of a mood media item object association table. The mood media item object association table of FIG. 5B comprises information indicative of associations between mood media item 522A and object 522, mood media item 522B and object 522, mood media item 524A and object 524, mood media item 526A and object 526, mood media item 526B and object 526, and mood media item 526C and object 526. For example, mood media items 526A, 526B, and 526C may be mood media items captured by users while viewing object 526. As such, an association between mood media items 526A, 526B, and 526C and object 526 has been established and stored in the mood media item object association table of FIG. 5B.

FIGS. 6A-6C are illustrations showing information associated with an object selection action according to at least one example embodiment. The examples of FIGS. 6A-6C are merely examples and do not limit the scope of the claims. For example, navigation elements may vary, locations may vary, apparatus interface design may vary, and/or the like.

In some circumstances, it may be desirable to allow for interaction with an object by way of an associated mood media item. For example, a user may desire to view information associated with the object after viewing the associated mood media item, may desire to be routed to a location associated with the object after viewing the associated mood media item, and/or the like. In at least one example embodiment, an apparatus causes rendering of a mood media item such that a visual representation of the mood media item is displayed. In at least one example embodiment, a mood media item is caused to be rendered in relation to the associated object media item. For example, as illustrated in FIG. 3B, apparatus 320 causes rendering of mood media item 322 such that a visual representation of mood media item 322 is displayed on a display of apparatus 320. In the example of FIG. 3B, mood media item 322 is caused to be rendered in relation to object media item 326, for example, mood media item 322 is caused to be displayed overlapping a portion of object media item 326. In another example, mood media item 322 of FIG. 3B may be caused to be rendered absent relation to object media item 326 of FIG. 3B.

In order to facilitate interaction with an object by way of an associated mood media item, it may be desirable to allow for selection of the mood media item. For example, a user may desire to intuitively and easily interact with an object and/or view ancillary information associated with the object by way of a touch screen comprised by the user's apparatus. In at least one example embodiment, an apparatus receives information indicative of a mood media item selection input that identifies the mood media item. The mood media item selection input may, for example, comprise a tap input, a tap and hold input, a drag input, and/or the like, such that the position of the mood media item selection input correlates with a display position of the mood media item. In at least one example embodiment, an apparatus causes performance of an object selection action associated with an object based, at least in part, on a mood media item selection input and an association between the mood media item and the object. For example, receipt of a mood media item selection input may cause performance of an object selection action in relation to the object associated with the selected mood media item.

In some circumstances, a user may desire to view general information associated with an object. For example, a user may desire to view operational hours associated with the Eiffel Tower. In at least one example embodiment, an object selection action comprises rendering of a representation of at least one object information media item associated with the object. An object information media item may, for example, comprise textual information associated with an object, graphical information associated with an object, audio information associated with an object, streaming data associated with an object, and/or the like. For example, as illustrated in the example of FIG. 3B, receipt of information indicative of a mood media item selection input correlating with the position of mood media item 322 and selecting mood media item 322 may cause performance of an object selection action relating to display of at least one object information media item associated with object 328, for example, display of viewing deck hours associated with the Eiffel Tower. In another example, an object relates to a stadium, and selection of a mood media item associated with the stadium by way of a mood media item selection input causes display of one or more score reports associated with a game occurring at the stadium, display of one or more image media items associated with the stadium, display of one or more video media items associated with the stadium, and/or the like.

In some circumstances, a user may desire to view location information associated with an object. For example, a user may desire to be routed to a location associated with the object. In at least one example embodiment, an object selection action relates to display of an indication of a location of an object. The indication of the location of the object may, for example, be a navigational route to the object, an indication of a direction to the object, one or more navigational directions to the object, and/or the like. In at least one example embodiment, an object is a particular point of interest. In such an example embodiment, an apparatus may determine a location of the object based, at least in part, on retrieval of information associated with the location of the object. For example, the apparatus may retrieve information associated with a location of a point of interest via a search of the Internet, a search of a location repository, and/or the like. Such a search may be based, at least in part, on the identification of the point of interest.

FIG. 6A is an illustration showing information associated with an object selection action according to at least one example embodiment. In the example of FIG. 6A, apparatus 602 causes display of map 604. In the example of FIG. 6A, map 604 comprises a visual representation of object location marker 606 associated with a location of object 608 and a visual representation of current location 612. Additionally, map 604 comprises a visual representation of navigation route 610, indicating a route between current location 612 and object location marker 606 associated with a location of object 608.

In at least one example embodiment, an indication of a location of an object is an object location marker. In such an example embodiment, display of the indication of the location of the object comprises display of the object location marker in relation to a map comprising the location. The object location marker may, for example, be displayed in relation to a navigation route to the location of the object. In at least one example embodiment, an apparatus determines a navigation route based, at least in part, on a current location and a location of an object. In at least one example embodiment, an apparatus determines a current location. Such a determination may be based, at least in part, on global positioning system location information, assisted global positioning system location information, cellular positioning location information, wireless positioning location information, and/or the like. In the example of FIG. 6A, map 604 comprises information indicative of a route to the Eiffel Tower. Display of map 604 may be based, at least in part, on selection of a mood media item associated with the Eiffel Tower. As illustrated, object 608 is a representation of the Eiffel Tower, displayed in relation to map 604. Object location marker 606 indicates a position on the map associated with the Eiffel Tower. Navigation route 610 indicates one potential route from current location 612 and to object 608.

FIG. 6B is an illustration showing information associated with an object selection action according to at least one example embodiment. In the example of FIG. 6B, apparatus 622 causes display of direction set 624. In the example of FIG. 6B, direction set 624 comprises one or more visual representations directions to object 628, such as direction 626.

In at least one example embodiment, an indication of a location of an object is at least one navigation direction associated with a navigation route. In such an example embodiment, display of the indication of the location of the object comprises display of the navigation direction. The navigation direction may, for example, be displayed in relation to a navigation route to the location of the object. In at least one example embodiment, an apparatus determines a navigation route based, at least in part, on a current location and a location of an object. In at least one example embodiment, an apparatus determines a current location. Such a determination may be based, at least in part, on global positioning system location information, assisted global positioning system location information, cellular positioning location information, wireless positioning location information, and/or the like. In the example of FIG. 6B, display of direction set 624, comprising information indicative of a set of navigation directions to the Eiffel Tower, may be based, at least in part, on selection of a mood media item associated with the Eiffel Tower. As illustrated, object 628 is a textual representation of the Eiffel Tower, displayed in relation to direction set 624. Direction set 624 indicates one potential navigation route from a current location and to object 628. For example, direction set 624 may be based, at least in part, on navigation route 610 of FIG. 6A.

FIG. 6C is an illustration showing information associated with an object selection action according to at least one example embodiment. In the example of FIG. 6C, apparatus 642 causes display of navigation cue 646. In the example of FIG. 6C, navigation cue 646 towards toward object 648 within augmented reality view 644. Augmented reality view 644 may be a representation of a view captured by apparatus 642 by way of a camera module comprised by apparatus 642 such that apparatus 642 displays a near-live stream of visual content depicting at least a portion of the surrounding of apparatus 642.

In at least one example embodiment, an indication of a location of an object is a navigation cue. In such an example embodiment, display of the indication of the location of the object comprises display of the navigation cue. Such display of the navigation cue may be in relation to concurrent display of an augmented reality view. In at least one example embodiment, an apparatus displays a navigation cue associated with an object such that the navigation cue points towards a location of the object when viewed from a viewer's perspective. In the example of FIG. 6C, display of navigation cue 646 such that navigation cue 646 points toward a location of the Eiffel Tower may be based, at least in part, on selection of a mood media item associated with the Eiffel Tower. As illustrated, object 648 is a visual representation of the Eiffel Tower, displayed in augmented reality view 648 and in relation to navigation cue 646. Navigation cue 646 indicates one potential navigation route from a current location and to object 648. For example, navigation cue 646 may be based, at least in part, on navigation route 610 of FIG. 6A.

Figure 7:
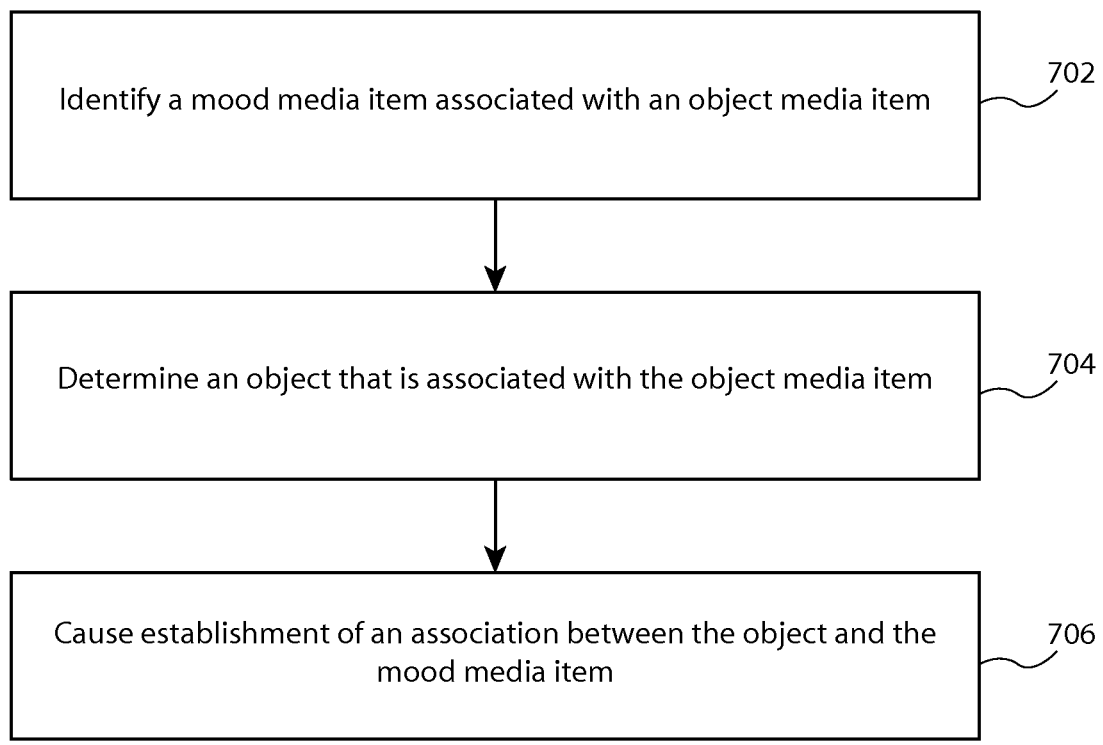
FIG. 7 is a flow diagram illustrating activities associated with causing establishing an association between an object and a mood media item according to at least one example embodiment.

FIG. 7 is a flow diagram illustrating activities associated with causing establishment of an association between an object and a mood media item according to at least one example embodiment. In at least one example embodiment, there is a set of operations that corresponds with the activities of FIG. 7. An apparatus, for example electronic apparatus 10 of FIG. 1, or a portion thereof, apparatus 402 of FIG. 4, or a portion thereof, or server 404 of FIG. 4, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

At block 702, the apparatus identifies a mood media item associated with an object media item. The identification, the mood media item, the object media item, the media item, the user, the face of the user, and the viewing of the object media item by the user may be similar as described regarding FIG. 2, FIGS. 3A-3B, and FIG. 4.

At block 704, the apparatus determines an object that is associated with the object media item. The determination, the object, and the association with the object media item may be similar as described regarding FIG. 2, FIGS. 3A-3B, and FIG. 4.

At block 706, the apparatus causes establishment of an association between the object and the mood media item. The causation, the establishment, and the association between the object and the mood media item may be similar as described regarding FIG. 2, FIGS. 3A-3B, FIG. 4, and FIGS. 5A-5B.

Figure 8:
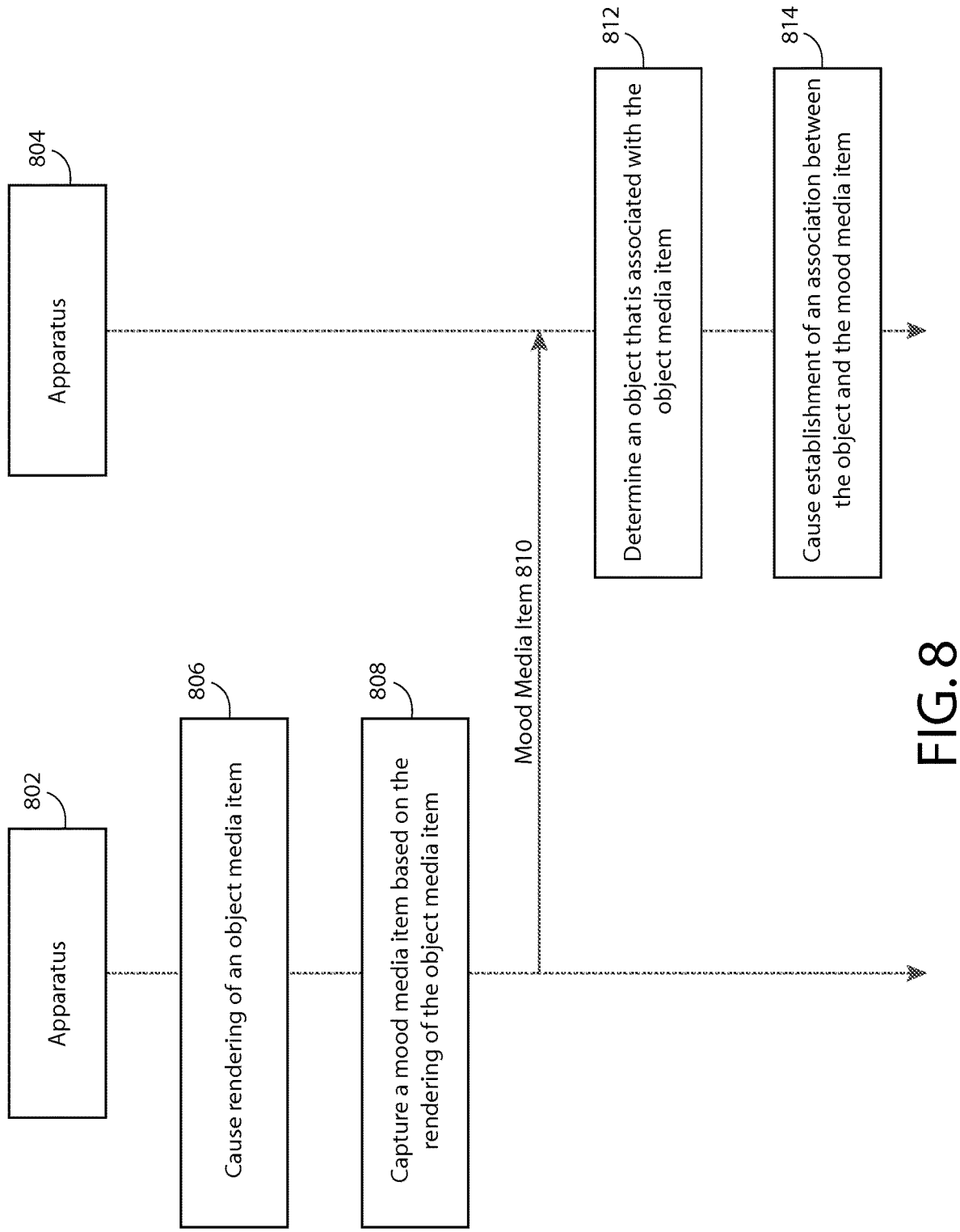
FIG. 8 is a simplified interaction diagram illustrating activities associated with causing establishment of an association between an object and a mood media item according to at least one example embodiment.

FIG. 8 is a simplified interaction diagram illustrating activities associated with causing establishment of an association between an object and a mood media item according to at least one example embodiment. In at least one example embodiment, there is a set of operations that corresponds with, at least some of, the activities of FIG. 8. For example, there may be a set of operations associated with activities of one or more apparatuses of FIG. 10. An apparatus, for example electronic apparatus 10 of FIG. 1, or a portion thereof, apparatus 402 of FIG. 4, or a portion thereof, or server 404 of FIG. 4, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

As previously discussed, in some circumstances, utilization of a separate apparatus for determination of an object associated with an object media item and/or for establishment of an association between the object and a mood media item may be desirable.

In the example of FIG. 8, apparatus 802 may be a phone, a tablet, a computer, an electronic apparatus, and/or the like. Apparatus 804 may be a server, a computer, a service platform, and/or the like. In at least one example embodiment, apparatus 802 and apparatus 804 communicate by way of a wireless communication channel, a cellular communication channel, a wireless local area network communication channel, a wideband communication channel, and/or the like.

At block 806, apparatus 802 causes rendering of an object media item. The causation, the rendering, and the object media item may be similar as described regarding FIG. 2, FIGS. 3A-3B, and FIG. 4.

At block 808, apparatus 802 captures a mood media item based, at least in part, on the rendering of the object media item. The capture and the mood media item may be similar as described regarding FIG. 2, FIGS. 3A-3B, and FIG. 4.

At interaction 810, apparatus 802 sends, to apparatus 804, the mood media item and information indicative of an association between the mood media item and the object media item. In this manner, apparatus 804 receives the mood media item and information indicative of an association between the mood media item and the object media item from apparatus 802. The communication, the receipt, and the association between the mood media item and the object media item may be similar as described regarding FIG. 2, FIGS. 3A-3B, and FIG. 4.

At block 812, apparatus 804 determines an object that is associated with the object media item, similar as described regarding block 704 of FIG. 7.

At block 814, apparatus 804 causes establishment of an association between the object and the mood media item, similar as described regarding block 706 of FIG. 7.

Figure 9:
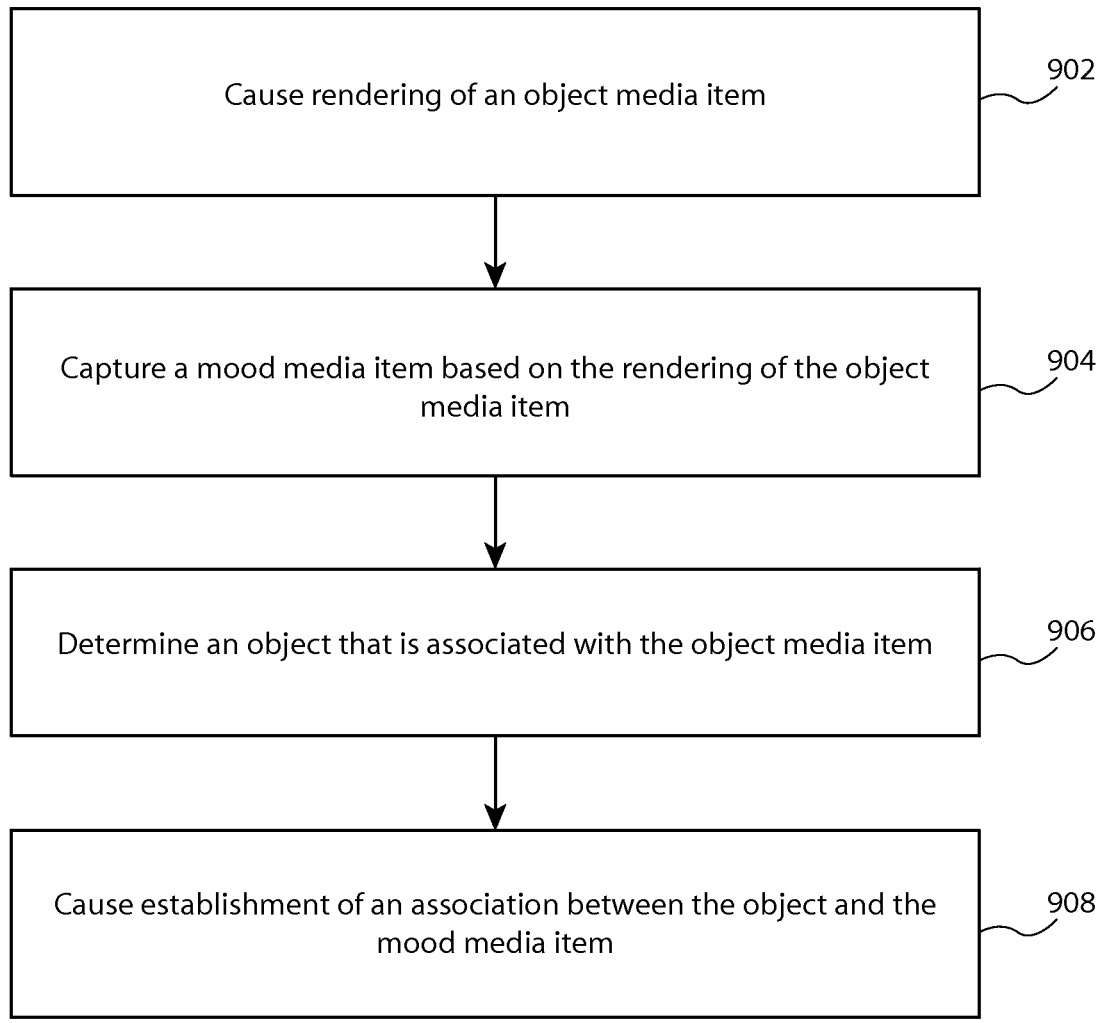
FIG. 9 is a flow diagram illustrating activities associated with causing establishment of an association between an object and a mood media item according to at least one example embodiment.

FIG. 9 is a flow diagram illustrating activities associated with causing establishment of an association between an object and a mood media item according to at least one example embodiment. In at least one example embodiment, there is a set of operations that corresponds with the activities of FIG. 9. An apparatus, for example electronic apparatus 10 of FIG. 1, or a portion thereof, apparatus 402 of FIG. 4, or a portion thereof, or server 404 of FIG. 4, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

As previously discussed, in some circumstances, identification of a mood media item associated with an object media item comprises causation of rendering of the object media item and capturing of the mood media item based, at least in part, on the rendering of the object media item. For example, an apparatus may cause rendering of an image of a building and capture a mood media item via a front camera module.

At block 902, the apparatus causes rendering of an object media item. The causation, the rendering, and the object media item may be similar as described regarding FIG. 2, FIGS. 3A-3B, and FIG. 4.

At block 904, the apparatus captures a mood media item based, at least in part, on the rendering of the object media item. The capture and the mood media item may be similar as described regarding FIG. 2, FIGS. 3A-3B, and FIG. 4.

At block 906, the apparatus determines an object that is associated with the object media item, similar as described regarding block 704 of FIG. 7.

At block 908, the apparatus causes establishment of an association between the object and the mood media item, similar as described regarding block 706 of FIG. 7.

Figure 10:
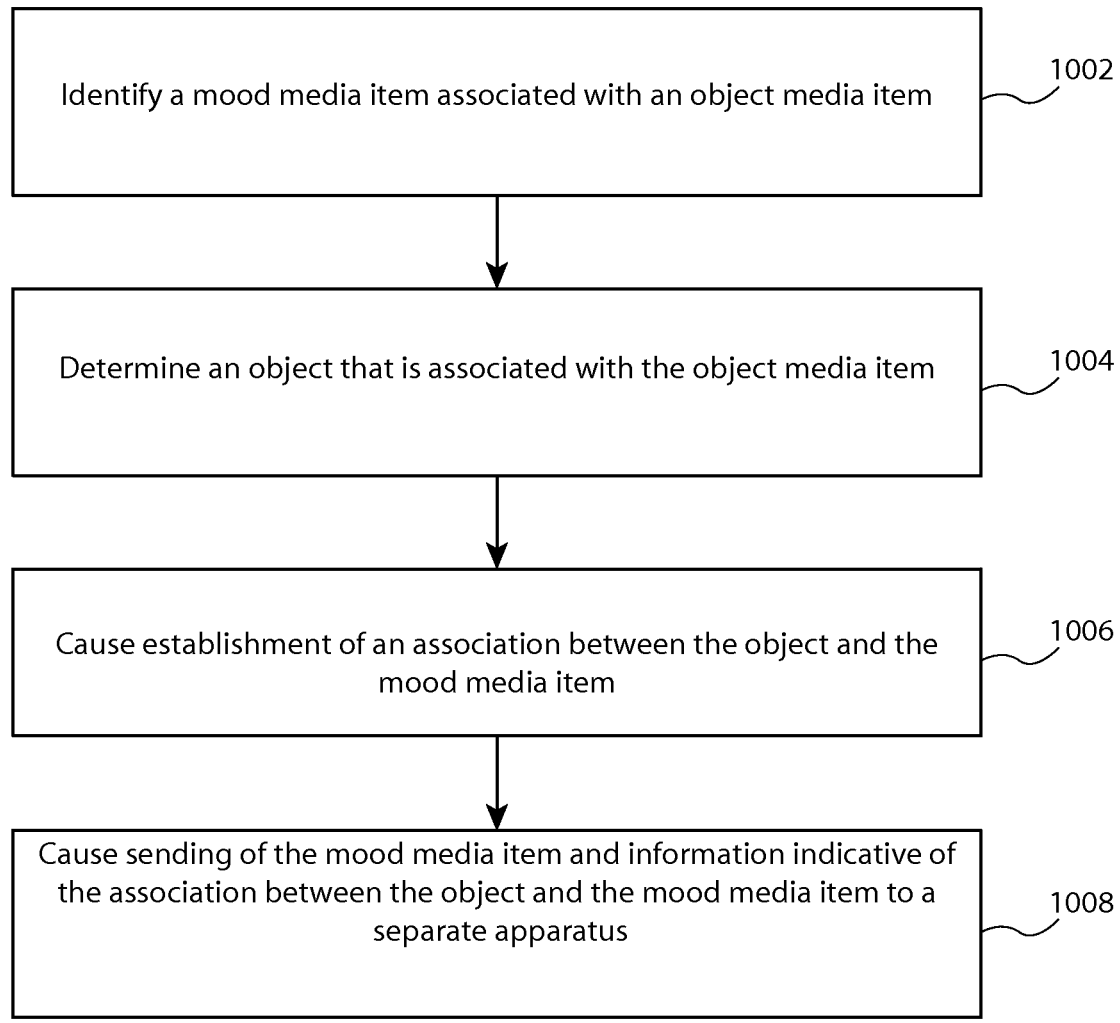
FIG. 10 is a flow diagram illustrating activities associated with causing establishment of an association between an object and a mood media item according to at least one example embodiment.

FIG. 10 is a flow diagram illustrating activities associated with causing establishment of an association between an object and a mood media item according to at least one example embodiment. In at least one example embodiment, there is a set of operations that corresponds with the activities of FIG. 10. An apparatus, for example electronic apparatus 10 of FIG. 1, or a portion thereof, apparatus 402 of FIG. 4, or a portion thereof, or server 404 of FIG. 4, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

As previously discussed, in some circumstances, an apparatus may send information indicative of an association between an object and a mood media item to a separate apparatus. For example, the apparatus may send information indicative of the association to a service platform server, another apparatus, and/or the like.

At block 1002, the apparatus identifies a mood media item associated with an object media item, similar as described regarding block 702 of FIG. 7.

At block 1004, the apparatus determines an object that is associated with the object media item, similar as described regarding block 704 of FIG. 7.

At block 1006, the apparatus causes establishment of an association between the object and the mood media item, similar as described regarding block 706 of FIG. 7.

At block 1008, the apparatus causes sending of the mood media item and information indicative of the association between the object and the mood media item to a separate apparatus. The sending, the causation of sending, and the separate apparatus may be similar as described regarding FIG. 2, FIGS. 3A-3B, and FIG. 4.

Figure 11:
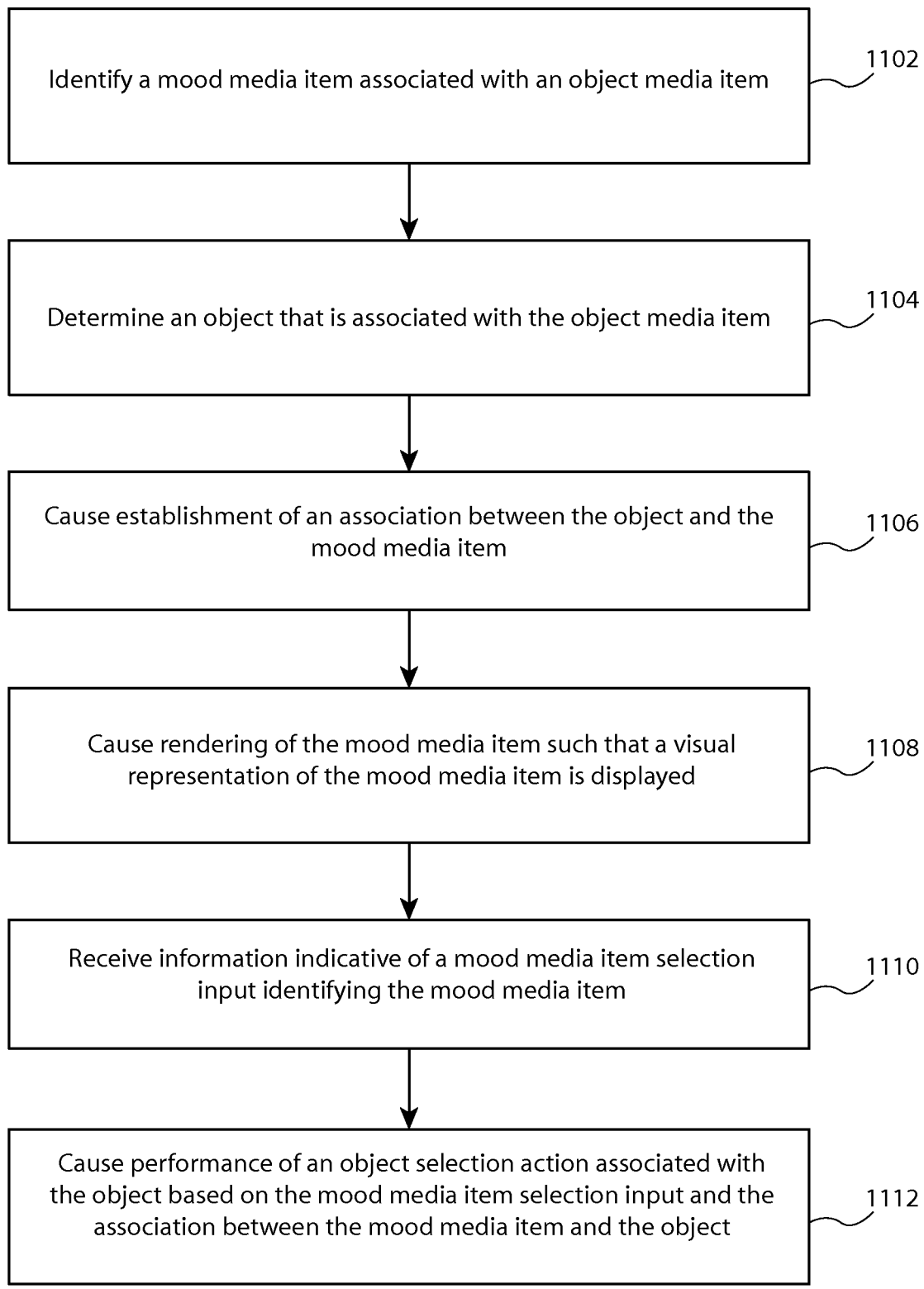
FIG. 11 is a flow diagram illustrating activities associated with causing an object selection action association with an object according to at least one example embodiment.

FIG. 11 is a flow diagram illustrating activities associated with causing performance of an object selection action association with an object according to at least one example embodiment. In at least one example embodiment, there is a set of operations that corresponds with the activities of FIG. 11. An apparatus, for example electronic apparatus 10 of FIG. 1, or a portion thereof, apparatus 402 of FIG. 4, or a portion thereof, or server 404 of FIG. 4, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

As previously discussed, in some circumstances, it may be desirable to allow for interaction with an object by way of an associated mood media item. For example, receipt of a mood media item input identifying a mood media item associated with an object may cause performance of an object selection action associated with the object.

At block 1102, the apparatus identifies a mood media item associated with an object media item, similar as described regarding block 702 of FIG. 7.

At block 1104, the apparatus determines an object that is associated with the object media item, similar as described regarding block 704 of FIG. 7.

At block 1106, the apparatus causes establishment of an association between the object and the mood media item, similar as described regarding block 706 of FIG. 7.

At block 1108, the apparatus causes rendering of the mood media item such that a visual representation of the mood media item is displayed. The rendering, the causation of rendering, the visual representation of the mood media item, and the display of the visual representation may be similar as described regarding FIG. 2, FIGS. 3A-3B, and FIG. 4.

At block 1110, the apparatus receives information indicative of a mood media item selection input identifying the mood media item. The receipt, the mood media item selection input, and the identification of the mood media item may be similar as described regarding FIG. 2, FIGS. 3A-3B, and FIG. 4.

At block 1112, the apparatus causes performance of an object selection action associated with the object based, at least in part, on the mood media item selection input and the association between the mood media item and the object. The performance, the causation of performance, and the object selection action may be similar as described regarding FIG. 2, FIGS. 3A-3B, FIG. 4, FIGS. 5A-5B, and FIGS. 6A-6C.

Figure 12:
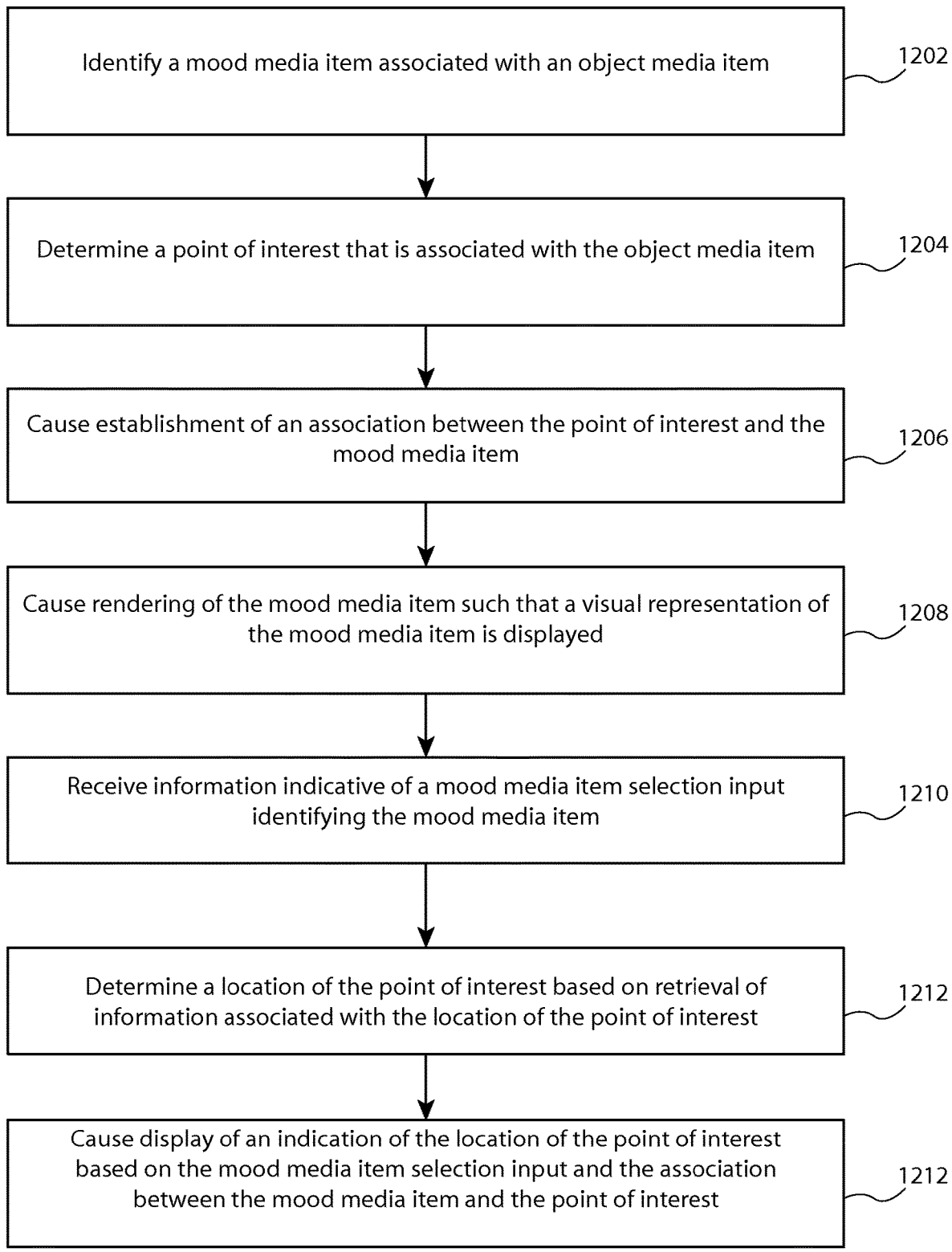
FIG. 12 is a flow diagram illustrating activities associated with causing display of an indication of a location of a point of interest according to at least one example embodiment.

FIG. 12 is a flow diagram illustrating activities associated with causing display of an indication of a location of a point of interest according to at least one example embodiment. In at least one example embodiment, there is a set of operations that corresponds with the activities of FIG. 12. An apparatus, for example electronic apparatus 10 of FIG. 1, or a portion thereof, apparatus 402 of FIG. 4, or a portion thereof, or server 404 of FIG. 4, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 12.

As previously discussed, in some circumstances, it may be desirable to allow for interaction with an object by way of an associated mood media item. For example, receipt of a mood media item input identifying a mood media item associated with an object may cause determination of a location of the object and causation of display of an indication of the location of the object.

At block 1202, the apparatus identifies a mood media item associated with an object media item, similar as described regarding block 702 of FIG. 7.

At block 1204, the apparatus determines a point of interest that is associated with the object media item. The determination, the point of interest, and the association with the object media item may be similar as described regarding FIG. 2, FIGS. 3A-3B, FIG. 4, and FIGS. 6A-6C.

At block 1206, the apparatus causes establishment of an association between the point of interest and the mood media item. The causation, the establishment, and the association between the point of interest and the mood media item may be similar as described regarding FIG. 2, FIGS. 3A-3B, FIG. 4, and FIGS. 5A-5B.

At block 1208, the apparatus causes rendering of the mood media item such that a visual representation of the mood media item is displayed. The rendering, the causation of rendering, the visual representation of the mood media item, and the display of the visual representation may be similar as described regarding FIG. 2, FIGS. 3A-3B, and FIG. 4.

At block 1210, the apparatus receives information indicative of a mood media item selection input identifying the mood media item. The receipt, the mood media item selection input, and the identification of the mood media item may be similar as described regarding FIG. 2, FIGS. 3A-3B, and FIG. 4.

At block 1212, the apparatus determines a location of the point of interest based, at least in part, on retrieval of information associated with the location of the point of interest. The determination, the location of the point of interest, the information associated with the location of the point of interest, and the retrieval of the information may be similar as described regarding FIG. 2, FIGS. 3A-3B, FIG. 4, and FIGS. 6A-6C.

At block 1214, the apparatus causes display of an indication of the location of the point of interest based, at least in part, on the mood media item selection input and the association between the mood media item and the point of interest. The display, the causation of display, and the indication of the location of the point of interest may be similar as described regarding FIG. 2, FIGS. 3A-3B, FIG. 4, FIGS. 5A-5B, and FIGS. 6A-6C.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 702 of FIG. 7 may be performed after block 704 of FIG. 7. Furthermore, if desired, one or more of the above-described functions may be optional or may be combined. For example, block 1214 of FIG. 12 may be optional and/or combined with block 1212 of FIG. 12.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
   at least one processor;
   at least one non-transitory memory including computer program code, the non-transitory memory and the computer program code configured to, working with the processor, cause the apparatus to:
   determine that an object media item was displayed on a screen associated with the apparatus at a particular time, wherein the object media item is a media item comprising a representation of at least one object displayed at the particular time;
   determine a mood media item associated with the object media item, the mood media item being a media item of a face of a user captured at a designated duration after rendering of the object media item on the screen associated with the apparatus;
   recognize the at least one object visually represented in the object media item which is the media item displayed on the screen associated with the apparatus at the particular time;
   establish an association between the at least one object and the mood media item; and
   transmit and/or store the mood media item and information indicative of the association between the at least one object and the mood media item, wherein the mood media item is configured to be rendered at an associated display.

2. The apparatus of claim 1, wherein, when determining the mood media item associated with the object media item, the at least one non-transitory memory including computer program code, the non-transitory memory and the computer program code further configured to receive the mood media item and information indicative of an association between the mood media item and the object media item.

3. The apparatus of claim 1, wherein, when determining the mood media item associated with the object media item, the at least one non-transitory memory including computer program code, the non-transitory memory and the computer program code further configured to
   render the object media item, and
   capture the mood media item based, at least in part, on the rendering of the object media item.

4. The apparatus of claim 3, wherein the mood media item is captured using a camera module of the apparatus.

5. The apparatus of claim 1, wherein the at least one non-transitory memory includes computer program code configured to, working with the processor, cause the apparatus to send the mood media item and information indicative of the association between the at least one object and the mood media item to a separate apparatus.

6. The apparatus of claim 1, wherein, when establishing the association between the at least one object and the mood media item, the at least one non-transitory memory including computer program code, the non-transitory memory and the computer program code further configured to cause establishment of an association between the mood media item and less than an entirety of the at least one object.

7. The apparatus of claim 1, wherein, when establishing the association between the at least one object and the mood media item, the at least one non-transitory memory including computer program code, the non-transitory memory and the computer program code further configured to comprises storage of information indicative of the association in memory.

8. The apparatus of claim 1, wherein, when establishing the association between the at least one object and the mood media item, the at least one non-transitory memory including computer program code, the non-transitory memory and the computer program code further configured to send a directive to a separate apparatus, the directive identifying the association.

9. The apparatus of claim 1, wherein the memory includes computer program code configured to, working with the processor, cause the apparatus to:
   render the mood media item such that a visual representation of the mood media item is displayed;
   receive information indicative of a mood media item selection input identifying the mood media item; and
   perform an object selection action associated with the at least one object based, at least in part, on the mood media item selection input and the association between the mood media item and the at least one object.

10. A method comprising:
    determining that an object media item was displayed on a screen associated with an apparatus at a particular time, wherein the object media item is a media item comprising a representation of at least one object displayed at the particular time;
    determining a mood media item associated with the object media item, the mood media item being a media item of a face of a user captured at a designated duration after rendering of the object media item on the screen associated with the apparatus;
    recognizing the at least one object visually represented in the object media item which is the media item displayed on the screen associated with the apparatus at the particular time;
    establishing an association between the at least one object and the mood media item; and
    transmitting and/or storing the mood media item and information indicative of the association between the at least one object and the mood media item, wherein the mood media item is configured to be rendered at an associated display.

11. The method of claim 10, wherein determining the mood media item associated with the object media item comprises receipt of the mood media item and information indicative of an association between the mood media item and the object media item.

12. The method of claim 10, wherein determining the mood media item associated with the object media item comprises causation of rendering of the object media item, and capture of the mood media item based, at least in part, on the rendering of the object media item.

13. The method of claim 10, further comprising causation of sending of the mood media item and information indicative of the association between the at least one object and the mood media item to a separate apparatus.

14. The method of claim 10, wherein establishing the association between the at least one object and the mood media item comprises causation of establishment of an association between the mood media item and less than an entirety of the at least one object.

15. The method of claim 10, wherein establishing the association between the at least one object and the mood media item comprises storage of information indicative of the association in memory.

16. The method of claim 10, wherein establishing the association between the at least one object and the mood media item comprises sending of a directive to a separate apparatus, the directive identifying the association.

17. At least one non-transitory computer-readable medium encoded with instructions that, when executed using a processor, perform:
   determination that an object media item was displayed on a screen associated with an apparatus at a particular time, wherein the object media item is a media item comprising a representation of at least one object displayed at the particular time;
   determination of a mood media item associated with the object media item, the mood media item being a media item of a face of a user captured at a designated duration after rendering of the object media item on the screen associated with the apparatus;
   recognition of the at least one object visually represented in the object media item which is the media item displayed on the screen associated with the apparatus at the particular time;
   causation of establishment of an association between the at least one object and the mood media item;
   sending of the mood media item and information indicative of the association between the at least one object and the mood media item, wherein the mood media item is configured to be rendered at an associated display.

18. The at least one non-transitory computer-readable medium of claim 17, wherein determination of the mood media item associated with the object media item comprises receipt of the mood media item and information indicative of an association between the mood media item and the object media item.

19. The at least one non-transitory computer-readable medium of claim 17, wherein determination of the mood media item associated with the object media item comprises causation of rendering of the object media item, and capture of the mood media item based, at least in part, on the rendering of the object media item.

20. The apparatus of claim 1, wherein, when recognizing the at least one object visually represented in the object media item, the at least one memory includes computer program code configured to, working with the processor, cause the apparatus to perform at least one of image segmentation, image analysis, image recognition, feature extraction and image comparison.

* * * * *